United States Patent Office 3,642,877
Patented Feb. 15, 1972

3,642,877
PROCESS FOR THE PREPARATION OF DIMETHYL-AMINOETHYL METHACRYLATE
Madhusudan D. Jayawant, Wilmington, Del., assignor to E. I. du Pont de Nemours and Company, Wilmington, Del.
No Drawing. Filed Dec. 27, 1968, Ser. No. 787,609
Int. Cl. C07c 69/54
U.S. Cl. 260—486 R                         3 Claims

ABSTRACT OF THE DISCLOSURE

A process for preparing dimethylaminoethyl methacrylate from dimethylaminoethanol and an alkyl methacrylate is provided. Di-n-butyltin oxide is used as a catalyst which can be added at one time after water is removed by distillation. The dimethylaminoethanol and alkyl methacrylate in certain proportions along with an inhibitor are mixed; heated to reflux and any water in the system removed by distillation. After a slight cooling, the catalyst is added, the reaction mixture heated to reflux and the azeotrope of alkyl methacrylate and alkanol formed is removed by distillation. After the alkanol is removed, heating is stopped and a gradual vacuum is applied to the receiver and unreacted alkyl methacrylate and dimethylaminoethanol are distilled off and then dimethylaminoethyl methacrylate distilled off at the reduced pressure.

BACKGROUND OF THE INVENTION

Field of invention

This invention relates to processes for preparing dimethylaminoethyl methacrylate from dimethylaminoethanol and alkyl methacrylates.

Prior art

It is known in the prior art to conduct an ester exchange reaction between dimethylaminoethanol and alkyl acrylates or methacrylates, such as methyl methacrylate, at certain reactant ratios, using alkali metal alkoxides as catalyst and inhibitors to retard the polymerization of methyl methacrylate and the final product in the reaction vessel. In these processes, the catalyst is added gradually over a period of time so as to improve yields. This technique is not entirely satisfactory from a commercial standpoint due to the continuous addition of catalyst over the reaction period and the tendency of the alkali metal alkoxide catalysts to initiate side reactions and undesirable polymeric products.

SUMMARY OF THE INVENTION

According to the present invention there is provided a process for preparing dimethylaminoethyl methacrylate which comprises mixing dimethylaminoethanol and an alkyl methacrylate in which the alkyl group is from 1 to 4 carbon atoms in a mole ratio from about 1:1.1 to 1:3.5 and about 1 to 3 weight percent of an inhibitor, based on the weight of dimethylaminoethanol, heating the mixture total reflux until the head temperature reaches the azeotrope temperature of water and alkyl methacrylate, distilling off the azeotrope of alkyl methacrylate and water, cooling the mixture, adding thereto di-n-butyltin oxide catalyst in an amount to supply about 0.2 to 1 mole percent catalyst per mole of dimethylaminoethanol, heating the reaction mixture to total reflux until the head temperature reaches the azeotrope temperature of the alkanol formed and the alkyl methacrylate, distilling off the azeotrope and alkyl methacrylate and alkanol, distilling off unreacted alkyl methacrylate and dimethylaminoethanol at a head temperature less than about 115° C., until dimethylaminoethyl methacrylate begins to distill, and distilling off dimethylaminoethyl methacrylate at a head temperature below about 115° C.

DETAILED DESCRIPTION OF THE INVENTION

The important factors in the success of the present process are the use of di-n-butyltin oxide as catalyst, the use of a suitable inhibitor and keeping the head temperature below about 115° C. during distillation of the product so as to avoid its polymerization. At reaction vessel temperatures over 130° C., the contents of the vessel have a tendency to polymerize, and yields are subsequently lowered.

Di-n-butyltin oxide as the catalyst is superior to many catalysts with respect to conversion, yields and the speed of the ester exchange reaction; however, the main advantage of this catalyst is that it can all be added to the reaction system at one time, whereas the alkali metal alkoxides must be added contituously to the reaction in order to maintain an efficient reaction rate. Di-n-butyltin oxide is commercially available and is used at a level of about 0.2 to 1 mole percent based on the dimethylaminoethanol. The preferred catalyst concentration is about 0.5 to 0.8 mole percent.

While ethyl and propyl methacrylate can be used as a co-reactant with the dimethylaminoethanol, they offer no advantage over methyl methacrylate which is, therefore, preferred. Butyl methacrylate has too many disadvantages to be commercially useful, but it can be used if the temperature is kept low enough to prevent polymer formation. The starting alkyl methacrylate:dimethylaminoethanol molar ratio should preferably be greater than about 1.5:1 (1.5–2.5:1), but the ratio can be between about 1.1:1 and 3.5:1. Excess alkyl methacrylate within the ratios specified will not only reduce side reactions but also ensure lower kettle temperatures during the reaction with the exception of butyl methacrylate.

Between about 1 and 3 percent by weight, based on the weight of dimethylaminoethanol, of an inhibitor must be used. A preferred range is between about 1.5 and 2.5 percent by weight, and usually over 2 percent by weight. For the best results in suppressing polymerization and increasing the dimethylaminoethyl methacrylate yield and purity, phenothiazine is preferred as the inhibitor, either alone or in combination with N,N-diethylhydroxylamine. The combination is useful since phenothiazine is a solid and is thus the effective inhibitor in the kettle, whereas diethylhydroxylamine is a liquid and the effective inhibitor in the column. Other inhibitors are methyl ether of hydroquinone, nitrobenzene, di-t-butyl catechol, hydroquinone, p-anilinophenol, and di-(2-ethylhexyl)-octylphenyl phosphite. For uses where dimethylaminoethyl methacrylate needs to be homo- or copolymerized with other polymerizable monomers, the inhibitor should not reduce the polymerization efficiency. Methyl ether of hydroquinone appears to be the preferred storage inhibitor for dimethylaminoethyl methacrylate so used.

In carrying out the process, maximum dehydration must be achieved before the addition of di-n-butyltin oxide catalyst, as the latter is deactivated readily by water. This is accomplished by heating the initial mixture of alkyl methacrylate, dimethylaminoethanol and inhibitor to total reflux and then distilling off the azeotrope of alkyl methacrylate and water, preferably at a suitable reflux ratio. The moisture content of the distillate can be checked by refractive index determination. The distillate removed should preferably be between 5 and 25 percent by weight of the starting alkyl methacrylate. It is at this point, after a cooling of the reaction mixture, that the catalyst is added to the kettle. The cooling should be sufficient to condense any vapors in the column.

The reaction mixture is heated to total reflux and then the azeotrope of alkyl methacrylate and alkanol formed is distilled off at a reflux ratio greater than 1:1, preferably about 5:1 to 7:1, at the temperature of the distilling azeotrope, i.e., about 65° C. for the methanol-methyl methacrylate azeotrope or about 78 to 85° C. for the ethanol-ethyl methacrylate azeotrope. Whatever materials are used, the head temperature should be kept under 115° C. If necessary, reduced pressure can be used to ensure that the 115° C. upper limit is not exceeded.

Generally, it is desirable to apply a vacuum after the alkanol-alkyl methacrylate azeotrope is distilled off to keep the reaction vessel temperature low. The vacuum is applied gradually to the receiver until the desired pressure is reacted. During this time, unreacted alkyl methacrylate and dimethylaminoethanol are distilled off preferably at a reflux ratio greater than 1:1 until dimethylaminoethyl methacrylate product begins to distill. The product is then removed by distillation, keeping the head temperature below about 115° C.

Dimethylaminoethyl methacrylate has many uses; for example, it provides homo- and copolymers useful in coatings, castings, films and fibers, as soil stabilizers, as adhesives and for other uses.

The invention can be further understood by the following examples in which parts and percentages are by weight unless otherwise indicated.

EXAMPLE 1

The following materials were charged to a flask and heated to steady boilings: 252 parts of methyl methacrylate (MMA), 96.2 parts of $\beta$-dimethylaminoethanol (DMAE) and 2.16 parts (2.25 weight percent of DMAE) of phenothiazine (PTZ). The mole ratio of MMA:DMAE was 2.33:1. The reaction mixture was refluxed until the head temperature was 95° C. and the MMA:water azeotrope was distilled at a reflux ratio of 5:1. When the distillate (MMA, water and some methanol) collected was approximately 8 percent by weight of the starting MMA, the distillation was stopped. The distillate weighed 19 parts, and had the refractive index of 1.4090 at 25° C.

The reaction mixture was cooled from about 104° C. to 90° C. and 1.73 parts of di-n-butyltin oxide (DBTO) (0.64 mole percent based on DMAE) were added to the flask and the reactants were heated to boiling. The MMA:methanol (MeOH) azeotrope was then distilled at a reflux ratio of 5:1. The head temperature was allowed to increase gradually from 65° C. to 80° C. and the distillation was stopped. The distillate weighed 37.5 parts and its refractive index was 1.3492 at 22° C.

After the separation of the distillate, heating was resumed and the apparatus was put on gradual reduced pressure. The unreacted MMA and DMAE distilled over rapidly, the main portion of this fraction being collected at 57–25° C. at 20–10 mm. The weight of this fraction was 142.8 parts and refractive index was 1.4137 at 24.5° C. Vapor phase chromatographic analysis of the fraction showed no DMAE, indicating a quantitative conversion.

The final product $\beta$-dimethylaminoethyl methacrylate (DMAEMA) was distilled at 70° C./10 mm. It was 99.5 percent pure and weighed 133.0 parts. Refractive index was 1.4366 at 24° C. The yield was 80 percent of the theory which does not include about 10 percent DMAEMA carried over in previous fraction.

The time required for various fractions described above were:

| Principal components | Minutes |
| --- | --- |
| Fraction: | |
| 1 — MMA plus H²O | 66 |
| 2 — MMA plus MeOH | 305 |
| 3 — MMA plus (DMAE) plus DMAEMA | 40 |
| 4 — DMAEMA | 40 |
| Total reaction time | 451 |

In this example the maximum temperature reached in the still-pot was 118° C.

EXAMPLE 2

A charge consisting of 226.8 parts of MMA, 86.58 parts of DMAE (Mole ratio of MMA:DMAE=2.33) and 1.90 parts (2.2 weight percent of DMAE) of PTZ was heated in a flask to total reflux. When the head temperature dropped (from 100° C.) to about 95° C., the water-MMA azeotrope was distilled at a reflux ratio of 5:1. When the distillate (MMA, water and some MeOH) collected was approximately 25 weight percent of the starting MMA, the distillation was stopped. The distillate weighed 59.1 parts and the refractive index was 1.4110 at 23° C.

The reaction mixture was cooled from 105° C. to about 100° C. and 1.6 parts of DBTO (0.66 mole percent based on DMAE) were added to the flask and the reactants were heated to boiling. The MMA:methanol azeotrope was distilled at a reflux ratio of 5:1. The distillation was continued until the head temperature reached 84.5° C. and there was extremely slow distillation. The distillation was stopped. The distillate weighed 43.5 parts and had the refractive index of 1.3680 at 23° C.

Unreacted MMA and DMAE were now distilled by gradual application of reduced pressure. Main portion of this fraction (MMA+DMAE+MeOH) distilled at 99 to 55° C. from atmospheric pressure to 46 mm. Total weight of this fraction was 108.5 parts and its refractive index was 1.4159 at 23° C.

DMAEMA was finally distilled at the head temperatures of 108 to 77° C. at 63 mm. to 18 mm. The yield of 99.97 percent pure DMAEMA was 100 gms. and the refractive index was 1.4371 at 23° C. The yield of the reaction was 66 percent, which does not include 11.6 percent DMAEMA carried over in the previous fraction.

The time required for various fractions described above were:

| Principal components | Minutes |
| --- | --- |
| Fraction: | |
| 1 — MMA plus H²O | 40 |
| 2 — MMA plus MeOH | 315 |
| 3 — MMA plus DMAE plus DMAEMA | 40 |
| 4 — DMAEMA | 27 |
| Total reaction time | 412 |

In this example, the maximum temperature reached in the still-pot was 125° C.

EXAMPLE 3

A mixture of 18,690 parts of NMA, 8350 parts of DMAE (MMA:DMAE mole ratio=2), 216 parts of Phenothiazine (2.59 weight percent of DMAE) and 41.4 parts (0.5 weight percent of DMAE) of 93 percent N,N-diethylhydroxylamine was heated and refluxed. When the head temperature dropped from about 100° to 84° C., distillation of MMA:water azeotrope was begun at a reflux ratio of 20:1. During the course of distillation the reflux ratio was reduced to 10:1 to maintain a steady distillation rate. When the distillate collected was approximately 15 weight percent of the starting MMA, the distillation was stopped. The distillate weighed 2281 parts and the refractive index was 1.4050 at 23.5° C. After separation of the distillate, the still-pot was allowed to cool to 24° C. and 184 parts (0.79 mole percent based on DMAE) of DBTO catalyst were added. The reaction mixture was then heated and put on total reflux until the head temperature lowered from about 99° C. to 65° C. MMA:MeOH azeotrope was then distilled at reflux ratios of 5:1 to 7:1. The distillation was continued until the distillation rate became exceedingly slow.

The distillate was collected and it weighed 2358 parts and had the refractive index of 1.3435 at 24.5° C. The methanol content of this fraction was 83.4 percent (vapor phase chromatography).

After the removal of MMA:MeOH azeotrope, reduced pressure was applied to the reaction assembly and unreacted DMAE and MMA were distilled at a reflux ratio of 2:1. Thus, at a pressure of 660 mm. and the still-pot temperature of 117° C., the fraction was boiling at 71° C. The reflux ratio was changed from 2:1 to 10:1, total reflux, 1:2, 1:3 and finally 20:1. The total weight of this fraction was 9560 parts.

Finally, DMAEMA remaining in the still-pot was distilled at a reflux ratio of 1:3 and the still-pot temperature of 107–110° C., head temperature of 91–89° C. and pressures of 32 mm. to 26 mm. Refined DMAEMA was 99.6 percent pure and it weighed 9800 parts. The refractive index of the monomer was 1.4380 at 23° C. The yield was 71 percent of the theory excluding the DMAEMA carried over in the previous fraction (9 percent by weight DMAEMA as determined by vapor phase chromatography).

The reaction times for various fractions were as follows:

| | Principal components | Hours |
|---|---|---|
| Fraction: | | |
| 1 | MMA plus H²O | 5.1 |
| 2 | MMA plus MeOH | 6.5 |
| 3 | MMA plus DMAE plus DMAEMA | 5.0 |
| 4 | DMAEMA | 2.75 |
| Total reaction time | | 19.35 |

At no time during this example did the still-pot temperature exceed 120° C.

What is claimed is:

1. A process for preparing dimethylaminoethyl methacrylate comprising: mixing dimethylaminoethanol and an alkyl methacrylate in which the alkyl group is from 1 to 4 carbon atoms in a mole ratio from about 1:1.1 to 1:3.5 and about 1 to 3 weight percent of an inhibitor, based on the weight of dimethylaminoethanol, heating the mixture to total reflux until the head temperature reaches the azeotrope temperature of water and alkyl methacrylate, distilling off the azeotrope of alkyl methacrylate and water, cooling the mixture, adding thereto di-n-butyltin oxide catalyst in an amount to supply about 0.2 to 1 mole percent catalyst per mole of dimethylaminoethanol, heating the reaction mixture to total reflux until the head temperature reaches the azeotrope temperature of the alkanol formed and the alkyl methacrylate, distilling off the azeotrope of alkyl methacrylate and alkanol, distilling off unreacted alkyl methacrylate and dimethylaminoethanol at a head temperature less than about 115° C., until dimethylaminoethyl methacrylate begins to distill, and distilling off dimethylaminoethyl methacrylate at a head temperature below about 115° C.

2. The process of claim 1 wherein the mole ratio of dimethylaminoethanol to alkyl methacrylate is about 1:1.5 to 1:2.5, the inhibitor is a mixture of phenothiazine and diethylhydroxylamine which is present at about 1.5 to 2.5 weight percent, and about 0.5 to 0.8 mole percent of the catalyst is used.

3. The process of claim 2 wherein the alkyl methacrylate is methyl methacrylate.

References Cited
UNITED STATES PATENTS 3,341,570   9/1967   Barie _____ 260—486 X LORRAINE A. WEINBERGER, Primary Examiner P. J. KILLOS, Assistant Examiner